(12) United States Patent
Bassani

(10) Patent No.: US 12,540,708 B2
(45) Date of Patent: Feb. 3, 2026

(54) HYDROGEN COMPRESSING SYSTEM AND METHOD FOR PRODUCING LOW-TEMPERATURE HIGH-PRESSURE HYDROGEN

(71) Applicant: NUOVO PIGNONE TECNOLOGIE—S.r.l., Florence (IT)

(72) Inventor: Simone Bassani, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 263 days.

(21) Appl. No.: 18/547,101

(22) PCT Filed: Feb. 24, 2022

(86) PCT No.: PCT/EP2022/025066
§ 371 (c)(1),
(2) Date: Aug. 18, 2023

(87) PCT Pub. No.: WO2022/179755
PCT Pub. Date: Sep. 1, 2022

(65) Prior Publication Data
US 2024/0125435 A1 Apr. 18, 2024

(30) Foreign Application Priority Data
Feb. 24, 2021 (IT) .......................... 102021000004298

(51) Int. Cl.
*F17C 5/06* (2006.01)
*F17C 13/04* (2006.01)

(52) U.S. Cl.
CPC ................ *F17C 5/06* (2013.01); *F17C 13/04* (2013.01); *F17C 2203/068* (2013.01);
(Continued)

(58) Field of Classification Search
CPC ...... F17C 5/06; F17C 13/04; F17C 2203/068; F17C 2221/012; F17C 2225/036; F17C 2227/0341; F17C 2265/01; Y02E 60/32
See application file for complete search history.

(56) References Cited

U.S. PATENT DOCUMENTS 11,035,520 B1 * 6/2021 Hashimoto ........... F04B 49/035
11,287,087 B2 * 3/2022 Werlen ...................... F17C 5/06
(Continued)

FOREIGN PATENT DOCUMENTS

CN 101245895 A * 8/2008 ............. F17C 11/00
GB 2632023 A * 1/2025 ............ F17C 13/084

*Primary Examiner* — Nicolas A Arnett
(74) *Attorney, Agent, or Firm* — Paul Frank + Collins P.C.

(57) ABSTRACT

The hydrogen compressing system has a first unit that receives hydrogen at low temperature and low pressure and compresses it, a second unit that cools down the hydrogen received from the first unit and a third unit that heats up and pressurizes the hydrogen received from the second unit; the high-pressure hydrogen is stored in a tank and afterwards may be supplied, for example, to a tank of a vehicle; pressurization at the third unit (300) is achieved by introducing cold hydrogen gas, well below ambient temperature, received from the second unit into the tank and heating it while the tank is closed preferably till when the hydrogen inside the tank reaches ambient temperature; heating-based compression allows to easily obtain high pressure through a relatively simple system and without risk of reducing the purity of the hydrogen.

9 Claims, 4 Drawing Sheets

(52) U.S. Cl.
CPC .. *F17C 2221/012* (2013.01); *F17C 2225/036* (2013.01); *F17C 2227/0341* (2013.01); *F17C 2265/01* (2013.01); *Y02E 60/32* (2013.01)

(56) References Cited

U.S. PATENT DOCUMENTS

| | | | | |
|---|---|---|---|---|
| 11,624,479 | B2* | 4/2023 | Francois | G01F 15/046 |
| | | | | 141/11 |
| 2005/0284154 | A1* | 12/2005 | Peter | F17C 3/08 |
| | | | | 62/53.2 |
| 2005/0287407 | A1* | 12/2005 | Bushko | H01M 8/04208 |
| | | | | 141/82 |
| 2010/0192568 | A1* | 8/2010 | Peacock | F04B 19/24 |
| | | | | 60/508 |
| 2012/0028140 | A1* | 2/2012 | Sutherland | F04B 53/162 |
| | | | | 429/408 |
| 2014/0196814 | A1* | 7/2014 | Nagura | F17C 13/026 |
| | | | | 141/82 |
| 2014/0216599 | A1* | 8/2014 | Loewenthal | F17C 5/00 |
| | | | | 141/4 |
| 2019/0032849 | A1* | 1/2019 | Seki | F25D 17/02 |
| 2024/0369054 | A1* | 11/2024 | Cangioli | F04D 25/06 |

\* cited by examiner

HYDROGEN COMPRESSING SYSTEM AND METHOD FOR PRODUCING LOW-TEMPERATURE HIGH-PRESSURE HYDROGEN

TECHNICAL FIELD

The subject-matter disclosed herein relates to hydrogen compressing systems and methods for producing low-temperature high-pressure hydrogen.

BACKGROUND ART

In the last years, many companies are investing their resources and research to find alternatives to the use of fossil fuels for the transport sector, which is responsible for around 25% of global energy consumption and 14% of total carbon dioxide emissions. An alternative that is being considered is represented by vehicles using hydrogen as an energy carrier.

Hydrogen compressing and storage systems become highly relevant for mobility applications, as a vehicle may store compressed hydrogen in a tank on board the vehicle and may use it to supply hydrogen for example to a fuel cell in order to power an electric motor or to a combustion engine.

To guarantee the operation and efficiency of vehicles, hydrogen fuel supplied has to satisfy certain specifications in terms of purity.

Hence, hydrogen fueling stations have to make high-purity compressed hydrogen available to refill vehicles that are fueled by hydrogen.

Typically, the compression of hydrogen is accomplished by using common compressor technology, such as rotary blade compressors, volumetric compressors, reciprocating compressors or diaphragm compressors.

According to US 2014/196814 A1, in a fueling station, hydrogen is cooled to a low temperature (e.g. −40° C.) just before being deliver to a vehicle tank so that a high quantity of hydrogen can be stored in the vehicle tank; after some time, the hydrogen heats up to ambient temperature and the pressure inside the vehicle tank increases.

According to US 2012/028140 A1, in a home fueling station, hydrogen is compressed only through successive heating steps starting from a base pressure (for example 135 bar at 15° C.) in a plurality of pressure vessels fluidly coupled in series, and the hydrogen compressed at high pressure (for example 700 bar at 15° C.) is finally stored in a tank; cooling steps may also be provided. The pressurized hydrogen stored in the tank may be delivered to vehicle tanks. This documents admits (read paragraph [0015] as well as claims 8 and 20) that the efficiency of such solution may be as low as 3-5%; this may be acceptable only in a home fueling station.

SUMMARY

It is advantageous for vehicle manufacturers to decrease the tank size on board to reduce weight and to increase space for other components.

To decrease vehicle tank size while maintaining the same hydrogen capacity, the hydrogen in the tank is compressed at very high-pressure, for example 700-1000 bar.

The specifications of high-purity hydrogen at high-pressure are very difficult to reach using common compressor technology. For example, reciprocating compressors require cylinder lubrication to work properly but lubrication oil at high-pressure would contaminate the compressed hydrogen, while using reciprocating compressors without lubrication for compressing hydrogen at high-pressure would result in seal performance and life time issues. Diaphragm compressors instead, are very good to ensure the right purity, but they have limitations in terms of flow and poor performances in terms of availability and efficiency.

According to an aspect, the subject-matter disclosed herein relates to a hydrogen compressing system having a first unit to compress hydrogen, a second unit to cool down the hydrogen received from the first unit and a third unit comprising a tank to heat up the hydrogen received from the second unit and so reach high-pressure in the tank; in particular, pressurization at the third unit is achieved by introducing cold hydrogen gas, well below ambient temperature, received from the second unit into the tank and heating it while the tank is fluidly isolated preferably till when the hydrogen inside the tank reaches ambient temperature. Afterwards, pressurized hydrogen in the tank can be delivered to vehicles in particular to vehicle tanks to fill them.

According to another aspect the subject-matter disclosed herein relates to a hydrogen fueling station using heat for compressing hydrogen.

According to still another aspect, the subject-matter disclosed herein relates to a method for producing low-temperature high-pressure hydrogen by heating a very-low-temperature (relatively) low-pressure hydrogen in a tank with a fixed volume or substantially-fixed volume while the tank is fluidly isolated.

BRIEF DESCRIPTION OF THE DRAWINGS

A more complete appreciation of the disclosed embodiments and of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
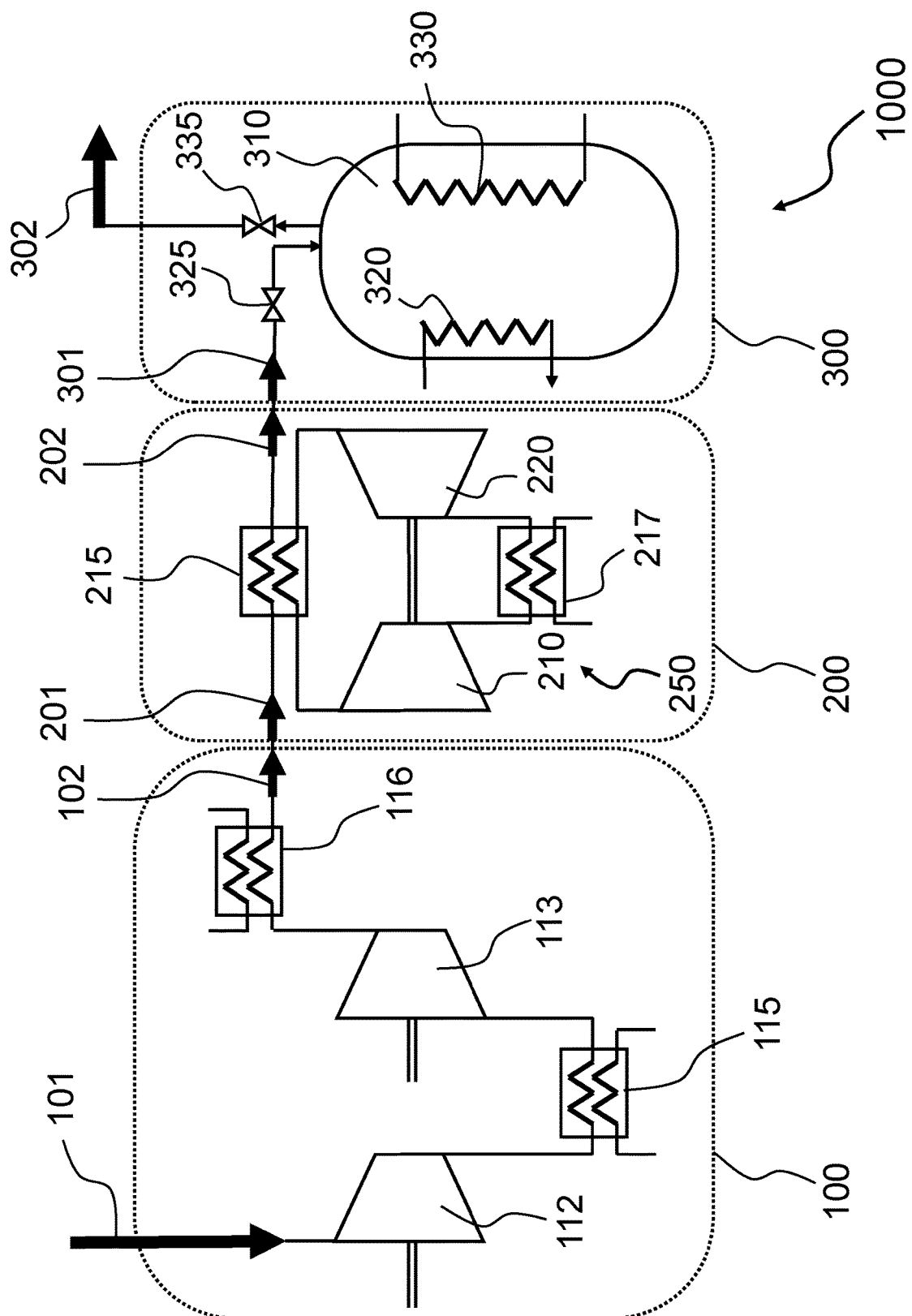
FIG. 1 shows a general schematic drawing of an embodiment of a compression system for producing low-temperature very-high-pressure hydrogen.

The subject matter herein disclosed relates to a compressing hydrogen system and to a method of producing low-temperature high-pressure hydrogen. Such system may be part of a hydrogen fueling station.

The hydrogen in hydrogen fueling stations has to be available at high pressure, ambient temperature and high purity to properly supply hydrogen to vehicles and ensure the correct vehicle operation. For example: pressure may be in the range from 700 bar to 1000 bar, temperature may be in the range from minus 20° C. to 50° C. (i.e. "ambient temperature" depending on the geographic place and the year season), purity may be in the range from 99 to 100, advantageously for some applications purity may be higher than 99.997%.

This can be achieved by using an innovative hydrogen compression system that has a tank that first is filled with hydrogen at very-low-temperature (for example minus 150° C.) low-pressure (for example 350 bar) and then is heated up to ambient temperature (for example 20° C.) while the tank is closed. Such heating increases the pressure of the hydrogen inside the tank (for example, up to 1000 bar). Afterwards, such tank may be used for example for fueling vehicles, i.e. for filling vehicle tanks with hydrogen at ambient temperature (in the range from e.g. minus 20° C. to e.g. 50° C.) and at high pressure (in the range of e.g. 700 bat to e.g. 1000 bar). Heating-based compression allows to easily obtain high pressure through a relatively simple system and without risk of reducing the purity of the hydrogen, contrary to rotating compressors and reciprocating compressors. Advantageously, the innovative hydrogen compressing system may be part of a hydrogen fueling station (placed for example along a public road) for fueling e.g. hydrogen vehicles or hybrid vehicles.

Reference now will be made in detail to embodiments of the disclosure illustrated in the drawings.

The embodiments are provided by way of explanation of the disclosure, not limitation of the disclosure. In fact, it will be apparent to those skilled in the art that various modifications and variations can be made in the present disclosure without departing from the scope or spirit of the disclosure.

With non-limiting reference to FIG. 1, a system 1000, in particular a hydrogen compressing system, is arranged to produce low-temperature high-pressure hydrogen.

According to this embodiment, the system 1000 comprises three different units (i.e. a first unit, a second unit, a third unit) arranged respectively to compress, cool and heat hydrogen to produce low-temperature high-pressure hydrogen, for example hydrogen being at ambient temperature and at pressure in the range between 700 bar and 1000 bar, preferably hydrogen being at temperature between 20° C. and 40° C. and at pressure between 900 bar and 1000 bar.

The first unit 100, having a first inlet 101 and a first outlet 102, is a compression unit configured to receive hydrogen at the first inlet 101, and to compress the received hydrogen to high-temperature low-pressure hydrogen. The first unit 100 may have one or more alternating or rotating compressors, single or multi-stage, that compress the received hydrogen through moving parts acting on the received hydrogen, such as blades of a rotating compressor or pistons of an reciprocating compressor.

Typically, the received hydrogen heats up due to compression. As shown in FIG. 1, the first unit 100 has a first rotating compressor 112 and a second rotating compressor 113, each compressor 112, 113 being followed by a heat exchanger, respectively a first heat exchanger 115 and a second heat exchanger 116, configured to cool down the received hydrogen.

The received hydrogen may come from a low-pressure low-temperature hydrogen supply line, for example at 20 bar and 40° C.; the received hydrogen is then compressed by rotating compressors 112, 113 of the first unit 100 up to a low-pressure required to fill the tank 310, taking into account any possible pressure drop in the system. For example, the first unit 100 compresses the received hydrogen up to a pressure in the range from 200 bar to 500 bar, advantageously up to a pressure in the range from 300 bar to 400 bar. It is to be noted that initial pressure and temperature of received hydrogen from hydrogen supply line may depend for example from the hydrogen storage system that makes hydrogen available to the hydrogen compression system.

Alternatively, the received hydrogen may come from a hydrogen supply line at 80 bar and 30° C., for example from a hydrogen storage system or a hydrogen pipeline.

Alternatively, the received hydrogen may come from a hydrogen supply line at 250 bar and 20° C.

Advantageously, the first outlet 102 of the first unit 100 can be selectively fluidly coupled to the first inlet 101 of the first unit 100 through a hydrogen recirculation loop 150 so that the received hydrogen can be recirculated from the first outlet 102 to the first inlet 101. Due to this, the hydrogen pressure at the first outlet 102 can be properly controlled, and so is the pressure required to fill or refill the tank 310 (see FIG. 2).

Figure 2:
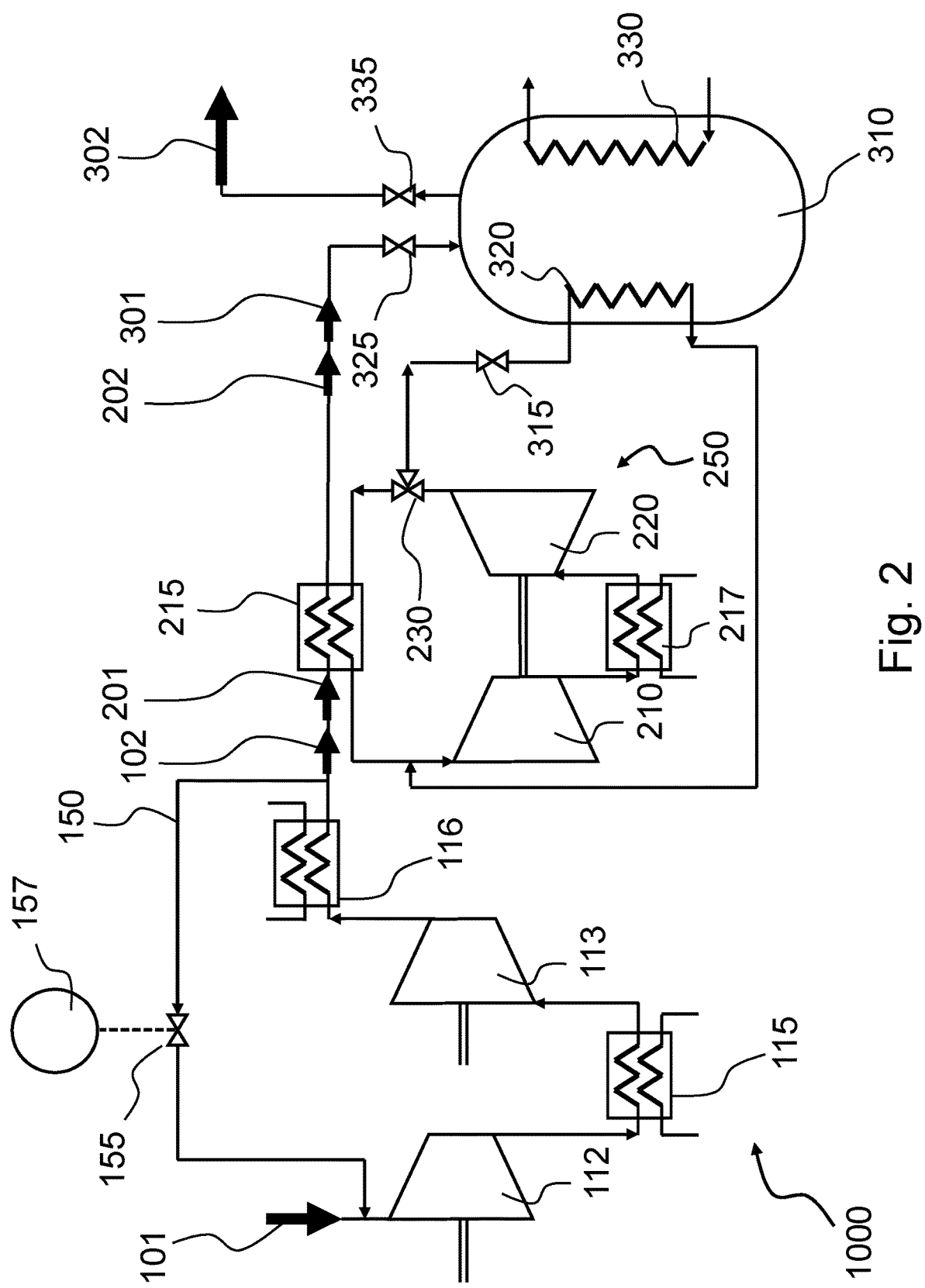
FIG. 2 shows a detailed schematic drawing of the embodiment of FIG. 1.

As shown in FIG. 2, the hydrogen recirculation loop 150 is provided with a pressure control valve 155 to control hydrogen pressure at the first unit outlet 102. In particular, a pressure controller 157 provides a control signal to the pressure control valve 155 to regulate the valve opening/closing.

The outlet 102 of first unit 100 is fluidly coupled to a inlet 201 of a second unit 200 and supplies high-temperature low-pressure hydrogen to the second unit 200.

The second unit 200 is configured to cool down the hydrogen received from the first unit 100, for example down to a temperature in the range from minus 200° C. to minus 100° C., advantageously down to a temperature in the range from minus 175° C. to minus 125° C. In particular, the second unit 200 comprises a first heat pump 250 configured to cool the hydrogen received from the second unit 200. The first heat pump is, for example, a compressor/expander system comprising a compressor 210 for increasing refrigeration fluid pressure, an expander 220 for decreasing refrigeration fluid pressure, a main heat exchanger 215 to heat up the refrigeration fluid and a heat exchanger 217 to cool down the refrigeration fluid.

The first heat pump 250 implements a first closed refrigeration cycle and uses nitrogen as refrigeration fluid, the nitrogen being used by the heat exchanger 215 to cool down the hydrogen received from the first unit 100. The use of nitrogen is advantageous to have a non-toxic, non-hazardous fluid; however, different refrigeration fluids can be selected depending on the specific application needs.

Alternatively, the first heat pump 250 is a compressor/valve system comprising a compressor 210 for increasing refrigeration fluid pressure, a laminating valve for decreasing refrigeration fluid pressure, a main heat exchanger 215 to heat up the refrigeration fluid and a heat exchanger 217 to cool down the refrigeration fluid.

Advantageously, if the first heat pump 250 is a compressor/valve system, the system 1000 comprises a second heat pump implementing a second closed refrigeration closed cycle and being configured to cool the nitrogen of the first heat pump 250. The second heat pump uses in particular carbon dioxide as a refrigeration fluid and is coupled to the first refrigeration closed cycle, in particular to the heat exchanger 217 to cool down the refrigeration fluid of the first heat pump 250.

A second outlet 202 of second unit 200 is fluidly coupled to a third inlet 301 of a third unit 300 and supplies very-low-temperature low-pressure hydrogen to the third unit 300, for example hydrogen at a temperature in the range between minus 200° C. and minus 100° C. and at a pressure in the range between 200 bar and 500 bar, preferably hydrogen at a temperature in the range between minus 175° C. and minus 125° C. and at a pressure in the range between 300 bar and 400 bar.

The third unit 300 is configured to increase pressure of hydrogen received from the second unit 200 through heating the hydrogen received from the second unit 200 in at least one tank 310 and store the pressurized hydrogen in the tank 310. Advantageously, the tank 310 is a fixed-volume tank. Advantageously, the tank 310 has peripheral walls comprising a material having a low thermal conductivity to avoid or reduce thermal losses. For example, the tank peripheral walls may have more layers which one of the layers is a thermal insulation layer to reduce thermal losses from the tank 310 to the surrounding ambient or there may be a gap between two layers to be filled with fluid or equipment. It is to be noted that a small amount of heat may still flow into the tank 310 from a surrounding ambient.

The third inlet 301 is selectively fluidly coupled to the second unit 200, in particular to the second outlet 202, by opening/closing of an inlet valve 325, from which the third unit 300 receives the very-low-temperature low-pressure hydrogen. The third unit 300 is further fluidly coupled to a third outlet 302, for example a distribution header fluidly coupled to a distribution unit suitable for fueling vehicles, i.e. filling vehicle tanks; the distribution unit may be considered a component of an innovative hydrogen compressing system; typically, the distribution unit is a component of an innovative fueling station. In particular, the tank 310 is selectively fluidly coupled to the third outlet 302 by opening/closing of an outlet valve 335 in order to deliver the pressurized hydrogen for examples to vehicles for filling their fuel tanks through the third outlet 302 when the hydrogen inside the tank is at appropriate conditions.

The third unit 300 is configured to receive the hydrogen from the second unit 200, supply the hydrogen in the tank 310 by opening of the inlet valve 325 and heat the hydrogen contained in the tank 310 up to a low temperature, in particular ambient temperature, while the inlet valve 325 is closed so to reach a high pressure inside the tank. The third unit 300 is further configured to keep the inlet valve 325 and the outlet valve 335 closed for a predetermined period of time after filling the tank 310 with the hydrogen received from the second unit 200; the predetermined period of time may be sufficient to reach the desired low temperature and the desired high pressure.

It is to be noted that the tank 310 is adapted to be filled with hydrogen received from second unit 200 and to supply the pressurized hydrogen to the distribution unit, so that the tank 310 is gradually emptied until hydrogen in the tank 310 reaches a predetermined for example minimum quantity or minimum pressure in the tank 310. When hydrogen in the tank 310 reaches for example the predetermined minimum quantity or minimum pressure, tank 310 may be refilled with hydrogen received from the second unit 200.

With non-limiting reference to FIG. 2, the tank 310 comprises at least one serpentine channel, located inside the tank 310 and configured to flow a cooling fluid and/or a warming fluid. Alternatively or additionally, the tank 310 comprises at least one serpentine channel, located inside a peripheral wall of the tank 310 and configured to flow a cooling fluid and/or a warming fluid. Advantageously, the tank 310 has a first serpentine channel, such as a cooling arrangement 320, configured to flow a cooling fluid and a second serpentine channel, such as a warming arrangement 330, configured to flow a warming fluid. The cooling fluid exchanges heat with the hydrogen in the tank 310 to cool down the hydrogen contained in the tank 310 and received from second unit 200. The heating fluid exchanges heat with the hydrogen in the tank 310 to heat up the hydrogen contained in the tank 310 received from second unit 200. It is to be noted that the warming arrangement may be avoided; for example, if no time limitations to complete hydrogen compression are foreseen, hydrogen in tank 310 can be heated up by surrounding ambient air, in particular ambient temperature air, exchanging heat through peripheral walls of tank 310.

Advantageously, the cooling arrangement 320 is fluidly connected to the second unit 200, in particular the first heat pump 250, producing very-low-temperature refrigeration fluid: part of refrigeration fluid of first heat pump 250 is deviated through a three-way valve 230 and injected in cooling arrangement 320 before being re-injected in the first heat pump 250.

The warming arrangement 330 uses a warming fluid, gas or liquid, for example air, to heat up hydrogen. It is to be noted that the warming fluid does not need to be at high temperature, for example a temperature higher than 50° C., since hydrogen contained in the tank 310 is at very-low-temperature, allowing exchanging heat even with low-temperature warming fluid, for example warming fluid at 30° C.

Advantageously, warming arrangement 330 is fluidly coupled to first unit 100 and uses the heat subtracted from the hydrogen received by the first unit 100 passing through heat exchangers 115, 116 to heat up the very-low-temperature hydrogen contained in the tank 310. Alternatively or additionally, warming arrangement 330 is fluidly coupled to the second unit 200 and uses the heat subtracted from the nitrogen by heat exchanger 217 to heat up the very-low-temperature hydrogen contained in tank 310.

As described below, the tank 310 is filled with hydrogen received from the second unit 200 through a pipe which fluidly connects the third inlet 301 with the tank 310 and wherein the hydrogen flow is regulated by the inlet valve 325. When the thank 310 is full of hydrogen received from second unit 200, the tank 310 is fluidly isolated from the second unit 200, for example by closing inlet valve 325.

Advantageously, the system 1000 comprises two or more tanks 310. With non-limiting reference to FIG. 3, the system 1000 comprises two tanks 310a, 310b, each one being independently fluidly connected or isolated to the second outlet 202 by inlet valves 325a, 325b. Advantageously, the two tanks 310a, 310b can operate in "series", being filled/refilled at the same time and being emptied in the same period of time, or can operate in "parallel", being filled/refilled and emptied in different periods of time.

Advantageously, each tank 310a, 310b comprises a first serpentine channel, in particular a cooling arrangement 320a, 320b fluidly connected to the second unit 200, wherein a three-way valve 250 is arranged to deviate part of the refrigeration fluid for injecting fluid in the cooling arrangements 320a, 320b to cool the hydrogen contained in each tank 310a, 310b. It is to be noted that each cooling arrangement 320a, 320b is independently fluidly connected to the second unit 200 and each cooling arrangement 320a, 320b comprises a valve 315a, 315b which regulates the injection of refrigeration fluid in the cooling arrangements 320a, 320b.

Advantageously, each tank 310a, 310b further comprises a second serpentine channel, in particular a warming arrangement 330a, 330b fluidly connected to the first unit 100, wherein the warming arrangement 330a, 330b receives a heating fluid to heat the hydrogen contained in each tank 310a, 310b. It is to be noted that each warming arrangement 330a, 330b is independently fluidly connected to the first unit 100, in particular to a heat exchanger 115, 116 of the first unit 100, and each warming arrangement 330a, 330b may receive heating fluid from a different heat exchanger.

For example, warming arrangement 330a may receive heating fluid from heat exchanger 115 and warming arrangement 330b may receive heating fluid from heat exchanger 116. It is to be noted that warming arrangement 330a, 330b may be avoided if the hydrogen contained in each tank 310a, 310b is heated up by ambient air, in particular ambient temperature air, exchanging heat through peripheral tank walls.

Advantageously, each tank 310a, 310b is arranged to supply low-temperature very-high-pressure to a third outlet 302, for example a distribution header connected to at least a distribution unit, in particular a hydrogen fuel pump suitable for refuel vehicles. In particular, the third unit 300 is configured to selectively fluidly couple the two tanks 310a, 310b to the third outlet 302, so that while the hydrogen contained in a tank of the two tanks 310a, 310b is pressurized, the hydrogen contained in another tank of the two tanks 310a, 310b is provided to the third outlet 302.

According to another aspect, the subject-matter disclosed herein relates to a method for producing low-temperature high-pressure hydrogen, in particular by heating low-temperature hydrogen contained in a tank. Such method may be implemented in a hydrogen compression system such as the hydrogen compression system described above.

The method includes a step of filling a tank 430 with a hydrogen at low temperature and a low pressure supplied from an inlet. When the tank is full of a predetermined quantity of hydrogen or of hydrogen at a predetermined pressure, then the tank is closed so to be fluidly isolated (step 440), and may remain fluidly isolated for a predetermined period of time; finally the hydrogen in the tank is heated (step 450) while the tank is fluidly isolated till when it reaches an ambient temperature by flowing heat into the tank; at the end of step 450 the hydrogen in the tank is at a high pressure; it is now possible to deliver the hydrogen to vehicles.

Advantageously, the low temperature is in the range between minus 200° C. and minus 100° C., the low pressure is in the range between 200 bar and 500 bar and the high pressure is in the range between 700 bar and 1000 bar. The heat used to heat the hydrogen may flow into the tank through peripheral walls of the tank, i.e. the heat comes from an ambient surrounding the tank. Alternatively or additionally, the heat used to heat the hydrogen may flow into the tank through a fluid, in particular a warming fluid fed to at least a first serpentine channel. The serpentine channel may be located inside the tank or inside a peripheral wall of the tank.

Advantageously, the method further comprises a step 420 of cooling the hydrogen to be used for filling the tank at step 430. For example, the hydrogen can be cooled before being injected in the tank through at least a second serpentine channel in which a cooling fluid flows and/or can be cooled once in the tank through a second heat exchanger, before fluidly isolating the tank (step 440).

Advantageously, the method further comprises a step 410 of compressing hydrogen to be cooled at step 420; in particular, hydrogen is compressed before being cooled. The compression step 410 is advantageously performed through at least one rotating or alternating compressor, i.e. through a moving parts compressor. Advantageously, if a plurality of compressors or a multi-stage compressor are used, hydrogen is cooled after each compressor or each stage of compression, before entering into the following compressor or stage of compression, so that each step 410 performed by each compressor is followed by the step 420.

According but non-limiting to an example of a system, shown in FIGS. 1 and 2, that can implement the above-described method, hydrogen is compressed by a first and a second compressor 112, 113 (step 410) and cooled down by a first and a second heat exchanger 115, 116 and a main heat exchanger 215 (step 420). Hydrogen is then injected in the tank 310 passing through an inlet valve 325 (step 430) until the pressure of hydrogen inside the tank, measured for example by a pressure sensor, is equal to the pressure of hydrogen supplied to the tank, i.e. the pressure of hydrogen at a third inlet 301 of third unit 300.

Advantageously, tank 310 comprises a temperature sensor detecting hydrogen temperature in the tank. If hydrogen temperature in the tank is equal to a predetermined desired temperature, the step 430 is over, the tank is fluidly isolated (step 440), for example by closing refrigeration valve 315 and inlet valve 325 and maintaining closed outlet valve 335. Hydrogen is then ready to be heated (step 450). Otherwise, if hydrogen temperature in the tank is higher than a predetermined desired temperature, hydrogen in the tank is cooled down during step 430, for example by refrigeration fluid passing through refrigeration valve 320, until hydrogen temperature in the tank is equal to the predetermined desired temperature, so that step 430 is over, tank is fluidly isolated (step 440) and hydrogen is ready to be heated (step 450).

After having fluidly isolated the tank (step 440), hydrogen temperature in tank is increased (step 450), for example by leaving tank exchanging heat through peripheral walls with ambient air or by using at least a serpentine channel, in particular a warming arrangement, for example by using a warming arrangement 330 shown in FIGS. 1 and 2. Advantageously, using a warming arrangement enables reducing hydrogen heating time. It is to be noted that by increasing hydrogen temperature in a fluidly isolated tank with fixed or substantially-fixed volume, hydrogen pressure will increase too.

Advantageously, tank 310 comprises a pressure sensor detecting hydrogen pressure in the tank 310. Hydrogen temperature in tank 310 is increased till when hydrogen temperature reaches an ambient temperature, for example a temperature in the range of minus 20° C.-50° C. Then, hydrogen heating (step 450) is stopped and hydrogen is ready to be selectively injected to the third outlet 302 by opening outlet valve 335. It is to be noted that hydrogen can be stored in fluidly-isolated tank 310 before being injected to a third outlet 302 of third unit 300.

If a plurality of tanks is used, step 430 and step 440 of the above-described method may be performed sequentially for the plurality of tanks. With non-limiting reference to FIG. 3, only after that first tank 310a has ended step 430, refrigeration valve 315a and inlet valve 325a are closed while maintaining outlet valve 335a closed (step 440), second tank 310b can start step 430 by opening refrigeration valve 315b and inlet valve 325b while maintaining outlet valve 335a closed, so to avoid inlet valves 325a, 325b simultaneously open which leads to having problems during step 430.

During hydrogen compression system start-up, tanks 310a, 310b are empty and have to be filled with inlet hydrogen: first unit 100 and second unit 200 are switched-on while refrigeration valve 315a and inlet valve 325a are open and outlet valve 335a is closed, as well as refrigeration valve 315b, inlet valve 325b and outlet valve 335b.

When tank 310a has ended steps 430 and 440, tank 310b can perform steps 430 and 440, by opening refrigeration valve 315b, inlet valve 325b and maintaining outlet valve 335b closed. It is to be noted that, during start-up, after having performed steps 430 and 440, thank 310a can perform step 450 while tank 310b is performing steps 430 or 440. Only after all tanks of the hydrogen compression system have performed steps 430 and 440, first unit 100 and second unit 200 can be switched-off, ending hydrogen compression system start-up.

Advantageously, a plurality of tanks is used alternatively for supplying low-temperature very-high pressure hydrogen to the third outlet so that when a tank is used for supplying low-temperature high pressure hydrogen to users at least another tank, after being already used for supplying low-temperature very-high pressure hydrogen to the third outlet, is pressurized.

Figure 3:
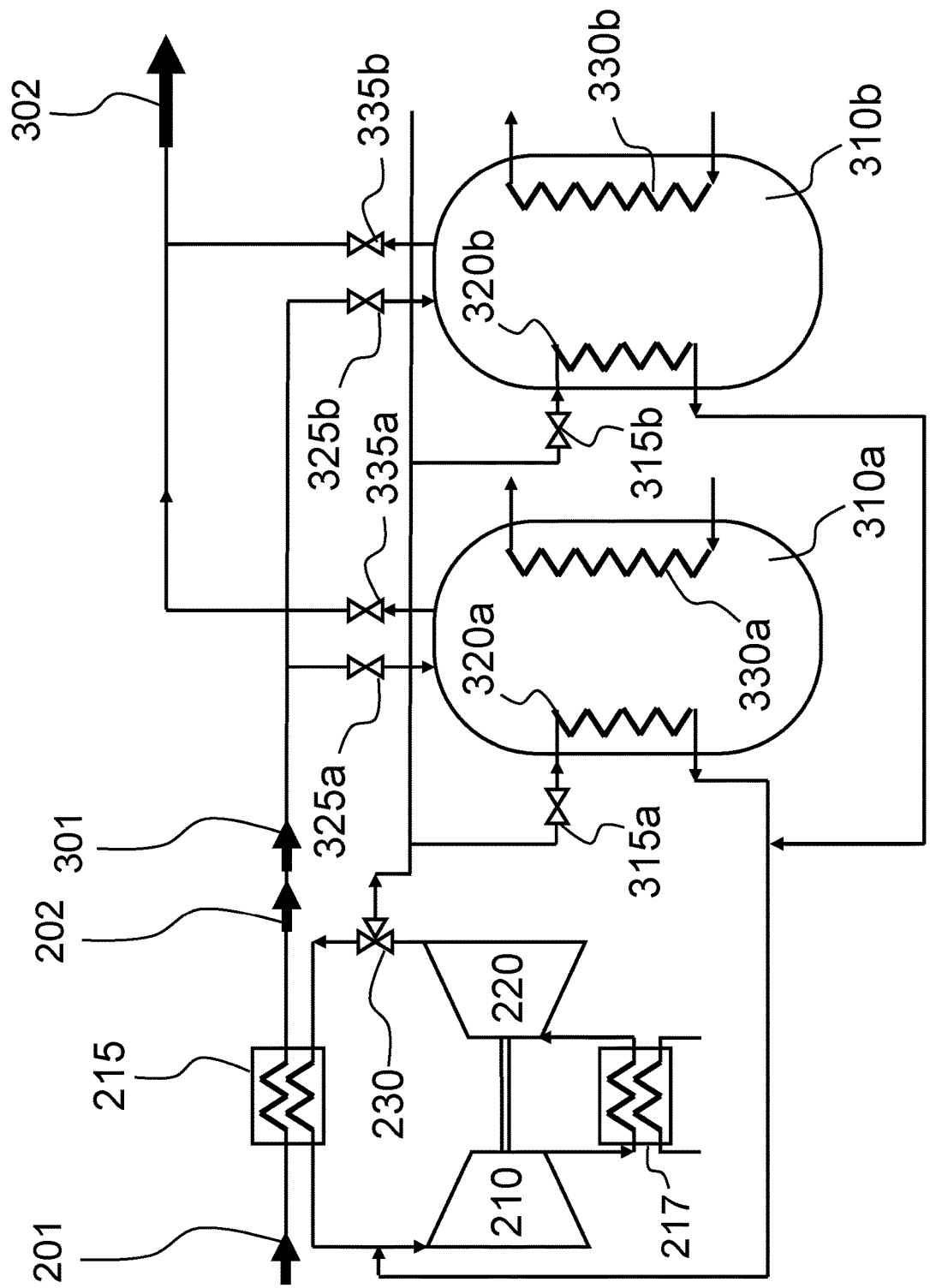
FIG. 3 shows a detailed schematic drawing of a second unit and some third units of the compression system of FIGS. 1 and 2.
Figure 4:
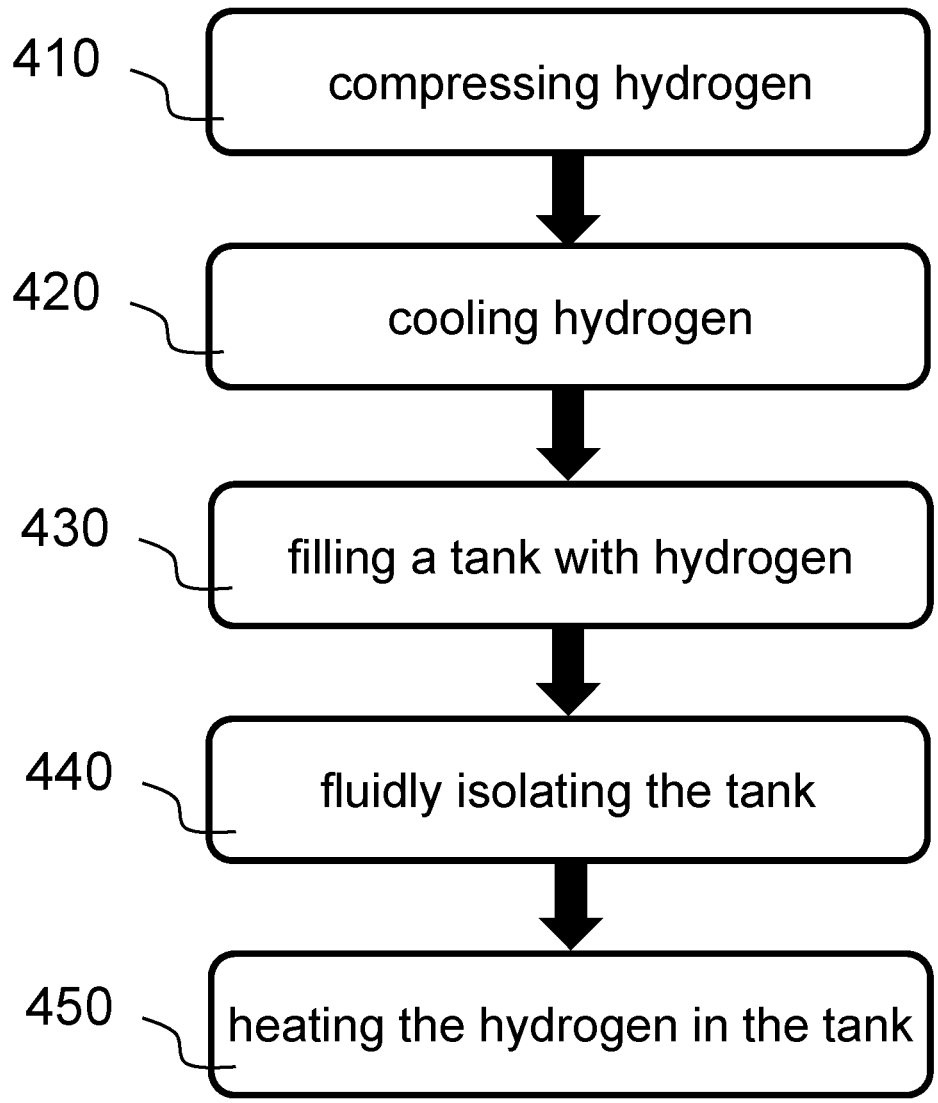
FIG. 4 shows a flow chart of an embodiment of a method for producing low-temperature very-high-pressure hydrogen.

With non-limiting reference to FIG. 3, to supply hydrogen from tank 310a to the third outlet 302, in particular to a distribution header, the inlet valve 325a is closed and the outlet valve 335a is opened.

To prepare tank 310b, that was already used for supplying low-temperature very-high-pressure hydrogen to the third outlet 302, the outlet valve 335b is closed while the inlet valve 325b is maintained closed so that the tank is fluidly isolated. It is to be noted that tank 310b is not empty but is filled with insufficient amount of hydrogen and/or hydrogen at lower pressure with respect to the high-pressure required by the third outlet 302, due to the hydrogen already supplied at the third outlet 302.

Refrigeration valve 315b is then opened to allow refrigeration fluid to pass through the cooling arrangement 320b, while the quantity of refrigeration fluid deviated from the second unit 200 is controlled by the three-way-valve 250.

While maintaining the inlet valve 325b closed, the first unit 100 and the second unit 200 are switched-on, so that step 410 and step 420 are performed till when hydrogen reaches the low temperature low pressure required to fill the tank 310b.

When hydrogen temperature and pressure have reached predetermined required values, the inlet valve 325b is opened and the tank 310b is filled with low-temperature low-pressure hydrogen (step 430). It is to be noted that low-temperature low-pressure hydrogen injected is mixed with the hydrogen already in the tank 310b during step 430.

It is to be noted that, due to inlet hydrogen mixing with hydrogen already in the tank, pressure and temperature conditions inside the tank may change. Advantageously, during step 430 refrigeration valve 315b is maintained opened to allow the refrigeration fluid to pass through cooling arrangement 320b, helping hydrogen in the tank 310b to reach the desired conditions in terms of pressure and temperature.

When hydrogen inside the tank 310b reaches the desired temperature and pressure conditions, the refrigeration valve 315b and the inlet valve 325b are closed and the outlet valve 335b is maintained closed, so to fluidly isolate tank 310b (step 440). Hydrogen temperature in tank 310b is increased by leaving tank 310b exchanging heat with ambient air or by flow heat in the tank 310b through a serpentine channel, for example the warming arrangement 330b (step 450).

Hydrogen temperature in tank 310b is increased till when it reaches an ambient temperature; then, pressurized hydrogen in the tank 310b is ready and can be stored in tank 310b or can be selectively injected to the third outlet 302 by opening the outlet valve 335b.

If other tanks of the hydrogen compression system are still filled with pressurized hydrogen, then the first unit 100 can be switched-off as well as the second unit 200. Otherwise, another tank can be pressurized as described before.

The invention claimed is:

1. A system for producing low-temperature, high-pressure hydrogen, the system comprising:
a first unit having a first inlet and a first outlet, wherein the first unit is configured to receives hydrogen at the first inlet at a low temperature and a low pressure, compresses the hydrogen through moving parts acting on the hydrogen, and provides the compressed hydrogen at the first outlet;
a second unit having a second inlet and a second outlet, the second inlet is fluidly coupled to the first outlet of the first unit, wherein the second unit cools the hydrogen received from the first unit;
a third unit having a third inlet and a third outlet, the third unit comprising a tank and an inlet valve for admitting fluid into the tank, wherein the third inlet is fluidly coupled to the second outlet, wherein the third unit is configured to heat the hydrogen contained in the tank up to ambient temperature while the inlet valve is closed to increase pressure of the hydrogen received from the second unit, and stores the hydrogen in the tank,
wherein the tank is configured to store the pressurized hydrogen at ambient temperature and higher pressure and to deliver the hydrogen through the third outlet.

2. The system of claim 1, wherein the third unit comprises further an outlet valve, and wherein the third unit is configured to keep the inlet valve and the outlet valve closed at least for a predetermined period of time after filling the tank with the hydrogen received from the second unit.

3. The system of claim 1, wherein the tank has peripheral walls comprising a material having a low thermal conductivity.

4. The system of claim 1, wherein the tank comprises at least one serpentine channel located inside the tank and configured to flow a cooling fluid and/or warming fluid.

5. The system of claim 1, wherein the tank comprises at least one serpentine channel located inside a peripheral wall of the tank and configured to flow a cooling fluid and/or warming fluid.

6. The system of claim 1, wherein the second unit comprises:
a first heat pump implementing a first closed refrigeration cycle and using nitrogen as refrigeration fluid, wherein the first heat pump is configured to cool the hydrogen received from the first unit;
a second heat pump implementing a second closed refrigeration cycle and using carbon dioxide as refrigeration fluid, wherein the second heat pump is configured to cool the nitrogen of the first heat pump.

7. The system of claim 1, wherein the first outlet is arranged to be selectively fluidly coupled to the first inlet during filling or refilling of the tank.

8. The system of claim 1,
wherein the third unit has a third outlet,
wherein the third unit comprises at least two tanks, and
wherein the third unit is configured to selectively fluidly couple the two tanks to the second outlet, and to selectively fluidly couple the two tanks to the third outlet, so that while the hydrogen contained in a tank of the two tanks is pressurized the hydrogen contained in another tank of the two tanks is provided to the third outlet.

9. A hydrogen fueling station comprising the system of claim 1.

* * * * *